I. DREYFUS.
INJECTOR.

No. 182,180. Patented Sept. 12, 1876.

Witnesses:
Orrell A. Dick,
W. E. Chaffee

Inventor:
Isidore Dreyfus
by Baltys Pollok Bailey

UNITED STATES PATENT OFFICE.

ISIDORE DREYFUS, OF NEW YORK, N. Y.

IMPROVEMENT IN INJECTORS.

Specification forming part of Letters Patent No. 182,180, dated September 12, 1876; application filed July 7, 1876.

*To all whom it may concern:*

Be it known that I, ISIDORE DREYFUS, of the city, county, and State of New York, have invented certain new and useful Improvements in Injectors or Ejectors, of which the following is a specification:

The rapid and thorough condensation of steam in an injector or ejector develops the power of the former and promotes the efficiency of the latter. The more rapidly and thoroughly the condensation is effected, the greater will be the benefit derived.

My invention has, principally, the above-named object in view. To this end I combine within the condensing-chamber with the steam-jet nozzle of an injector or ejector a device which may be distinguished as a spreader, having, preferably, a cone-shaped tapering or pointed lower end, which is located opposite to the center of the nozzle, so that the steam which issues from the nozzle shall be brought into immediate contact with the inclined surfaces of the spreader, and thus be scattered and diffused throughout the entire condensing-chamber. Under these conditions the steam is more readily taken hold of and condensed by the inflowing water. I can also make the spreader hollow, or with channel or channels opening toward the receiving-chamber or nozzle, and can connect the same by independent pipes and connections with the sources of water and steam supply, or either, for purposes hereinafter stated.

To enable those skilled in the art to understand and use my invention, I will now proceed to describe the manner in which the same is or may be carried into effect by reference to the accompanying drawing, in which—

Figure 1:
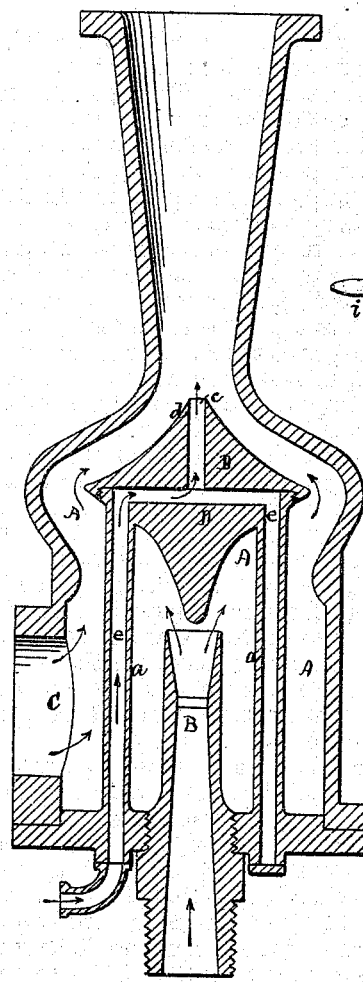
Figure 2:
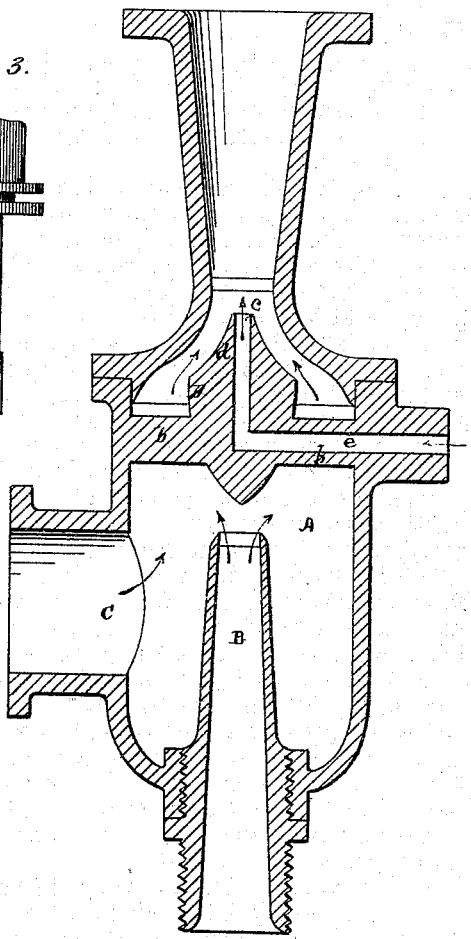

Figure 1 is a longitudinal central section of so much of an injector as is required to illustrate my invention. Fig. 2 is a like section of a similar apparatus embodying a different arrangement for supporting the spreader in place in front of the steam-jet nozzle.

A is the condensing-chamber of the injector; B is the steam-jet nozzle; C is the water-inlet, these parts being arranged in any ordinary or suitable way. In front of and in proximity to the steam-jet nozzle is the spreader hereinbefore referred to, consisting, in this instance, of a conical or tapering body, D, made of brass or other material, with its pointed end reaching toward the center of the steam-jet nozzle. The spreader is held in place by two or more connecting-pins, *a*, secured to the bottom of the condensing-chamber, as indicated in Fig. 1, or by two or more bridges, *b*, secured to the sides of the chamber, as indicated in Fig. 2; or it may be secured in any other suitable manner, care being taken that it shall not interfere with the free passage of the water. I prefer, as above stated, to make the spreader hollow, or with a channel or channels, connecting by independent pipes and connections with the sources of water and steam supply, or either. Such a construction is shown in the drawing, the spreader being hollow, or with a channel, *c*, which opens through the base *d* of the spreader toward the receiving-chamber or nozzle. One or more channels, *e*, extend, in Fig. 1, through the hollow pins *a*, and in Fig. 2 through one of the bridges *b*, and serve to connect the hollow spreader with the pipe or pipes leading to the water or steam supply. The pipes and connections that belong to the hollow spreader should be independent of those that supply steam and water to the apparatus in the usual way.

The effect of a spreader so constructed and situated will be as follows: First, the pointed end, coming in immediate contact with the center of the steam-jet as it issues from the nozzle, scatters and diffuses it throughout the entire chamber, so that the water pouring in from all sides can more readily and quickly take hold of it and condense it, having a larger space to operate in than if the steam-jet were projected into the chamber in the usual concentrated form, which does not readily admit of a mingling with the water for the purposes of condensation.

The separation and diffusion of the steam-jet at this point over a greater condensing area, for the purpose of condensation, is a very important part of the improvement, and the certain effect is a more rapid and complete condensation of the steam-jet than could possibly otherwise take place.

Second, if the independent channel connecting the said spreader with the water-supply outside be opened, and water admitted, the cold water coming in will cool the surface and pointed end of the spreader sufficiently to have a marked effect on the steam-jet, and accelerate still more the condensation of the same.

Third, the water thus introduced, besides assisting in the condensing process, as described, becomes an auxiliary or secondary water-supply to feed the boiler. This is quite an improvement in an economical point of view, the water thus introduced being carried along without extra expense of steam by the water admitted in the regular way, and impregnated with the velocity of the steam-jet, as before described.

Fourth, if the independent channel connecting the cone with the steam-supply be opened, and steam let into it, a vacuum or partial vacuum is produced in the water-supply pipe or tube connecting the injector or ejector with the tank or reservoir from whence the water-supply is to be drawn. The vacuum or partial vacuum extracts the air from the pipes, and the water follows as a matter of course. When the water has been thus drawn, and the injector or ejector started working, this independent steam communication may be closed, and the cone resume its specific operation of assisting in the condensation of the steam-jet, as heretofore explained.

I am enabled in this way to bring water to an injector or ejector without employing the spindle and similar devices in present use.

Figure 3:
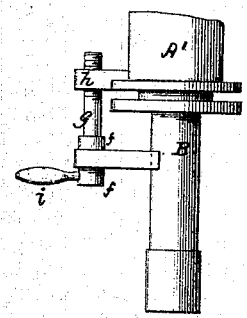

It may be found advantageous on some accounts to render the spreader and the steam-jet nozzle adjustable with relation to one another. This may be effected by making either the nozzle or the spreader movable. In Fig. 3 of the drawing I have shown an arrangement for this purpose. The steam-jet pipe or nozzle B passes up through a stuffing-box formed in the neck or lower part A' of the condensing-chamber A. From the pipe B projects a lug, in which is held, by collars $f$, the rotating adjusting-screw $g$, whose screw-threaded end screws into or through a lug, $h$, on the neck A'. By turning the screw by means of its handle $i$, it is obvious that the distance between the nozzle and spreader can be increased or lessened, as desired, thus providing a means of regulating, increasing, or diminishing the quantity of steam admitted.

I have described and shown my invention in its preferred form; but it is manifest that the details may be considerably varied without departure from my invention. The device which I have termed the spreader may have a form other than conical—as, for instance, spherical or cruciform. So, also, the water-supply channel may arranged and used specifically, either to cool the condensing-surface of the spreader or to afford an additional supply of water. I so arrange them that they will perform both functions I do not limit myself, therefore, to the specific instrumentalities herein set forth in illustration of my invention; but What I do claim, and desire to secure by Letters Patent, is—

1. The combination, substantially as set forth, of a hollow or channeled spreader, arranged within the condensing-chamber, as described, with an external water-supply for producing an auxiliary or secondary supply to feed the boiler, or for cooling the condensing-surface of the spreader, or for performing both operations, as specified.

2. The combination, substantially as described, within an injector or ejector, of a spreader, for facilitating the condensation of the steam-jet, with a steam-supply pipe communicating with said spreader, substantially as set forth, whereby a vacuum or partial vacuum may be created in the water-supply pipe, to raise or draw water to the injector or ejector.

3. The combination, substantially as set forth, of the spreader and the steam-jet nozzle, adjustable to and from one another, substantially as and for the purposes described.

In testimony whereof I have hereunto signed my name this 6th day of July, A. D. 1876.

ISIDORE DREYFUS.

Witnesses:
 G. A. BISCHOFF,
 CHARLES JUDGE.